United States Patent
Harris et al.

(12) 
(10) Patent No.: US 6,737,498 B2
(45) Date of Patent: May 18, 2004

(54) GOLF BALLS WITH SEGMENTED POLYURETHANE

(75) Inventors: Kevin M Harris, New Bedford, MA (US); Murali Rajagopalan, South Dartmouth, MA (US)

(73) Assignee: Acushnet Company, Fairhaven, MA (US)

( * ) Notice: Subject to any disclaimer, the term of this patent is extended or adjusted under 35 U.S.C. 154(b) by 44 days.

(21) Appl. No.: 10/277,122

(22) Filed: Oct. 21, 2002

(65) Prior Publication Data

US 2003/0078343 A1 Apr. 24, 2003

Related U.S. Application Data

(60) Provisional application No. 60/346,226, filed on Oct. 22, 2001.

(51) Int. Cl.[7] .......................... A63B 37/12; C08G 18/00; C08G 18/40
(52) U.S. Cl. .............................. 528/85; 528/28; 528/76; 473/354; 473/374; 473/378
(58) Field of Search .............................. 528/28, 76, 85; 473/354, 374, 378

(56) References Cited

U.S. PATENT DOCUMENTS

| | | | |
|---|---|---|---|
| 4,675,361 A | 6/1987 | Ward, Jr. ...................... | 525/92 |
| 5,221,724 A | 6/1993 | Li et al. ....................... | 528/28 |
| 5,428,123 A | 6/1995 | Ward et al. .................... | 128/28 |
| 5,461,134 A | 10/1995 | Leir et al. ..................... | 528/14 |
| 5,530,083 A | 6/1996 | Phelps et al. .................. | 528/25 |
| 5,589,563 A | 12/1996 | Ward et al. .................... | 428/44 |
| 5,863,627 A | 1/1999 | Szycher et al. ............. | 428/36.8 |
| 5,976,035 A | 11/1999 | Umezawa et al. .......... | 473/364 |
| 6,159,110 A | 12/2000 | Sullivan et al. ............. | 473/373 |
| 6,162,134 A | 12/2000 | Sullivan et al. ............. | 473/373 |
| 6,204,331 B1 | 3/2001 | Sullivan et al. ............. | 525/221 |
| 6,207,784 B1 | 3/2001 | Rajagopalan ................. | 528/71 |

Primary Examiner—David J. Buttner
(74) Attorney, Agent, or Firm—D. Michael Burns

(57) ABSTRACT

A golf ball comprising a core, a cover, and at least one intermediate layer disposed between the core and the cover, wherein the intermediate layer includes a segmented polyurethane elastomer copolymers.

14 Claims, 1 Drawing Sheet

GOLF BALLS WITH SEGMENTED POLYURETHANE

CROSS-REFERENCE TO RELATED APPLICATION

This application claims priority to U.S. Provisional Application No. 60/346,226, filed Oct. 22, 2001.

FIELD OF THE INVENTION

The present invention relates to golf balls and more specifically, to the use of segmented polyurethane materials in a golf ball layers for improving golf ball physical properties.

BACKGROUND OF THE INVENTION

Conventional golf balls can be divided into two general types or groups: solid balls and wound balls. The difference in play characteristics resulting from these different types of constructions can be quite significant. Balls having a solid construction generally provide a very durable ball while also providing maximum distance. Solid balls are generally made with a solid core (of one or more layers) encased by a cover of at least one layer. Typically, solid cores are made of polybutadiene that are chemically cross-linked with zinc diacrylate (or similar cross-linking agents). The covers are generally a material such as SURLYN®, an ionomer resin produced by DuPont, or, more recently, polyurethane. Such a combination imparts a high initial velocity to the ball that results in improved distance. Because these materials can be very rigid, many two-piece balls have a hard "feel" when struck with a club. Likewise, due to their hardness, these balls can also have a relatively low spin rate, which provides greater distance.

Wound balls typically have either a solid rubber or liquid center core around which many yards of a tensioned elastomeric material are wound and are covered with a durable cover material such as ionomer or polyurethane. Wound balls are generally softer and provide more spin than do solid golf balls. This enables a skilled golfer to have better control over ball flight. Particularly, with approach shots into the green, the high spin rate of soft, wound balls enables the golfer to stop the ball very near its landing position.

The design and technology of golf balls has advanced to the point that the United States Golf Association has instituted a rule prohibiting the use of any golf ball, in a USGA sanctioned event, that can achieve an initial velocity of greater than 255 ft/s when struck by an implement having a velocity of 143 ft/s (referred to hereinafter as "the USGA test").

Manufacturers place a great deal of emphasis on producing golf balls that consistently achieve the highest possible velocity in the USGA test without exceeding the limit, which are available with a range of different properties and characteristics, such as velocity, spin, and compression. Thus, a variety of different balls are available to meet the needs and desires of a wide range of golfers.

Regardless of the construction of the ball, players generally seek a golf ball that delivers maximum distance, which requires a high initial velocity upon impact. Therefore, in an effort to meet the demands of the marketplace, manufacturers strive to produce golf balls with high initial velocities.

As a result, golf ball manufacturers are continually searching for new ways in which to provide golf balls that deliver the maximum performance for golfers at all skill levels, and seek to discover compositions that provide the performance of a high compression ball with lower compression.

The physical characteristics of a golf ball are determined by the combined properties of the core, any intermediate layers, and the cover. These, in turn, are determined by the chemical compositions of each. The composition of some balls will provide for increased distance. Other compositions provide for improved spin. Manufacturers are constantly looking to develop the ideal materials. Thermoplastic polyurethane ureas for example, have been examined for their innate ability to provide material having very high tensile strengths, which is a very desired property in the make-up of a golf ball.

Segmented polyurethanes are elastomers with a solvent base. They can be processed by methods that involve combining an aromatic polyetherurethane urea with a soft segment of polycarbonate and a hard segment of diphenylmethane diisocyanate and mixed diamines. Hard segments are usually the reaction product of an aromatic diisocyanate and a low molecular weight, chain-extending dialcohol or diol. Soft segments may be synthesized from polycarbonate polyols with terminal hydroxyl (—OH) groups. The hydroxyl creates a urethane group, while the reaction between isocyanates and existing urea groups will form allophanate groups that can produce minor amounts of covalent cross-linking. When heated, the hydrogen-bonded hard segments and any allophanate cross-links, dissociate to allow the polymer to melt and flow. Dissolution in a polar solvent can also disrupt the hydrogen bonds that hold together the hard segments on adjacent chains. Once these virtual cross-links are broken, the polymer can be fabricated into golf ball layers. Upon cooling or solvent evaporation, the hard segments de-mix from the soft segments to re-associate by hydrogen bonding. This restores the original mechanical properties of the thermoplastic elastomer. Conventional segmented polyurethanes generally have excellent physical properties, combining high elongation and high tensile strength, but they are a solvent by nature. By reacting a primary amine first with the isocyanate to form a secondary amine and then the remaining hydrogen on the secondary amine can react a second time with another isocyanate moiety to form a tertiary amine. This second reaction forms a cross-link, which leads to a thermoset material. Secondary amines cannot form secondary reactions, therefore, the urea group does not react with additional isocyanate to form cross-links, and the product is a thermoplastic, which is amine cured.

Therefore, there exists a need for a golf ball comprising a segmented polyurethane for improved golf ball performance. By varying the urea hard segment during synthesis, a whole family of polymers of related chemistry can be produced having a wide range of hardness, modulus, tensile-strength, and elongation.

SUMMARY

The invention is related to a use of a segmented polyurethane comprising urea in the hard segment for the formation of a golf ball core, cover, or intermediate layer.

A first embodiment is a golf ball comprising a core and a cover, at least one of which is formed from a segmented polyurethane comprising an aromatic urea hard segment and a polycarbonate based soft segment. BioSpan® C, is an example of a suitable segmented polyurethane material and is commercially-available from the Polymer Technology Group, Inc.

Another embodiment of the invention incorporates a segmented polyurethane comprising on aromatic urea hard segment and a polyether based soft segment. An example is BioSpan® SPU, which is a registered trademark for a segmented polyurethane material commercially-available from the Polymer Technology Group, Inc.

Most preferably, the segmented PU of the invention is an intermediate layer. Other embodiments of the invention blend the block copolymer of polycarbonate-polyurethane with at least one thermoplastic or thermoset polymer including ionomers and copolymers including highly neutralized polymers, epoxies, styrenic and olefinic homo- and copolymers (including metallocenes and single-site); polyamides; polyesters; polydienes; block copolymers of polyether (or ester)-ester and polyether (or ester)-amides. Examples of these may be found in U.S. patents issued to Ward et al. U.S. Pat. Nos. 4,675,361; 5,428,123; 5,589,563; and 5,863,627, Li et al. U.S. Pat. No. 5,221,724; and Leir et al. U.S. Pat. No. 5,461,134, which are incorporated by reference herein in their entirety.

One embodiment of the invention is a two-piece or a multi-layered golf ball having a coefficient of restitution greater than about 0.7 measured at an incoming velocity of 125 ft/s, and an Atti compression of at least about 50. A golf ball having a core, intermediate layer, and a cover is the preferred construction of the present invention. 1 such as construction, preferably the intermediate layer comprises a segmented polyurethane such that it the layer has a material tensile strength of greater than about 3000 psi.

Surface-modifying end groups (SMEs) are surface-active oligomers covalently bonded to the base polymer during synthesis. The compositions of the invention can also include SMEs that will control surface chemistry without compromising the bulk properties of the polymer. Key surface properties, such as abrasion resistance, are permanently enhanced without additional post-fabrication treatments or topical coatings.

DETAILED DESCRIPTION OF EMBODIMENTS

Figure 1:
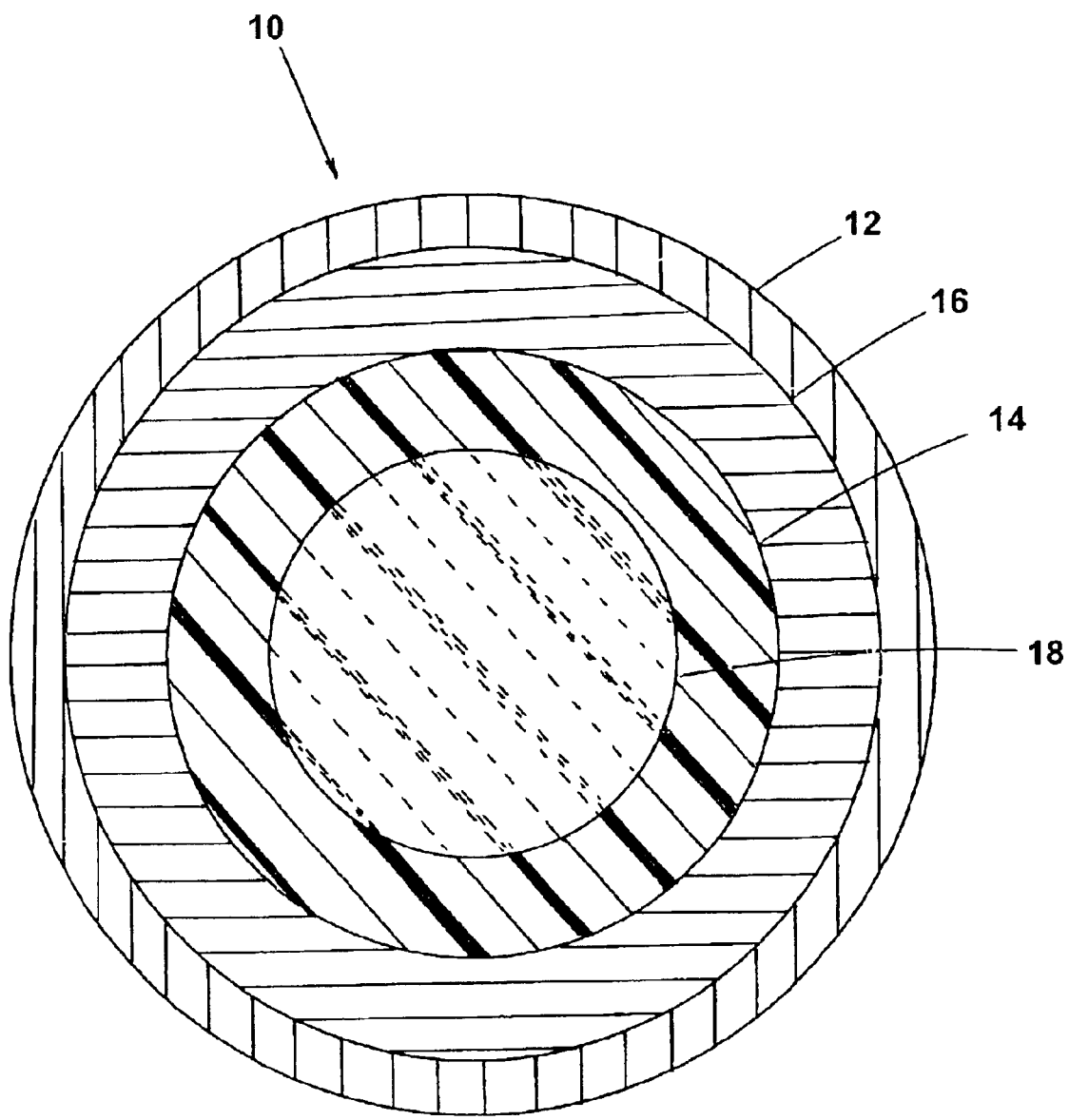
FIG. 1 is a cross-sectional view of a golf ball of the present invention.

The golf ball 10 of the invention comprises a core 14 of at least one layer, a cover 12 of at least one layer disposed concentrically about the core 14, and may optionally include at least one intermediate layer 16 between the cover 12 and the core 14. Any of these layers may contain thermoplastic urethane copolymers having polycarbonate in the soft segment of the copolymer, but preferably, the intermediate layer contains thermoplastic urethane copolymers having polycarbonate in the soft segment. Any of the layers may be formed of a tensioned elastomeric material. The center 18 of core may also be solid, hollow, fluid filled, or gel filled.

One example of a segmented polyurethane commercially-available today includes BioSpan®, the tradename of the segmented polyurethane available from Polymer Technology Group, Inc. Polymers have been synthesized that exhibit good oxidative stability, excellent mechanical strength and abrasion resistance. Ultimate tensile strengths for BioSpan® compounds may exceed 10,000 psi.

U.S. Pat. No. 5,756,632 issued to Ward, describes how commercially-available BioSpan® is processed. BioSpan®C is a segmented polyurethane that is formed as the reaction product of a hydroxyl terminated polycarbonate, an aromatic diisocyanate, and a low molecular weight diamine used as a chain extender. BioSpan® SPU is a segmented polyether that is formed as the reaction product of a hydroxyl terminated polyether, an aromatic diisocyante, and a low molecular weight diamine. In a preferred embodiment, the reaction of isocyanate groups with low molecular weight di-functional reagents leads to chain extension, and to the formation of hard segments connecting the polycarbonate soft segments through urethane groups. If the chain extender is a diol, the hard segment has repeat units connected by urethane groups, whereas if it is a diamine, the hard segment comprises urea groups. In the later case, the resulting polymer is referred to as a polyurethaneurea. Polyurethaneureas are highly phase-separated elastomers that are generally manufactured in solution unless the diamine chain extender is completely replaced by water. When the total content of hard segment is lowered, useful urea-containing urethanes are obtained. These are elastomers approaching natural rubber characteristics. The polyurethaneureas exhibit good phase separation, low hardness and extreme toughness.

Further compositions may also be added to the segmented polyurethane components of the invention, such as, SMEs, suitable compatibilizers, coloring agents, reaction enhancers, cross-linking agents, blowing agents, dyes, lubricants, fillers (including density modifying fillers), excipients, process aids and other compounds commonly added to polymeric materials and/or golfball compositions.

Surface-modifying end groups are surface-active oligomers bonded to the base polymer during synthesis. SMEs, that include silicone, sulfonate, flurocarbon, polyethylene oxide and hydrocarbon groups, control surface chemistry without compromising the bulk properties of the polymer. Key surface properties, such as abrasion resistance, are permanently enhanced without the additional post-fabrication treatments or topical coatings. The addition of SMEs provides a series of base polymers that can actually achieve a desired surface chemistry without the use of additives. This leaves the original polymer backbone intact so that the polymer retains strength and processing ability. Having all the polymer chains carrying the surface-modifying moiety eliminates many of the potential problems associated with additives.

The composition of any golf ball component that do not contain the segmented polyurethanes of the present invention disclosed herein can be any such composition known to and readily selected by those of ordinary skill in the art.

The resultant golf balls typically have a coefficient of restitution of greater than about 0.7, preferably greater than about 0.75, and more preferably greater than about 0.78, when measured at an incoming velocity of 125 ft/s. The golf balls also typically have an ATTI compression of at least about 40, preferably from about 50 to 120, and more preferably about 60 to 100. As used herein, the term "compression" refers to those measured by an ATTI compression gauge. These gauges are well known to those of ordinary skill in the art and are commercially-available from Atti Engineering Corp. of Union City, N.J.

The present invention relates to golf balls of any size. While USGA specifications limit the size of a competition golf ball to more than 1.68 inches in diameter, golf balls of any size can be used for leisure golf play. The preferred diameter of golf balls is from about 1.68 inches to about 1.76 inches. A diameter of from about 1.68 inches to about 1.74 inches is most preferred. The core of the ball preferably has a diameter from about 1.0 to about 1.62 inches. The cover of a golf ball may typically have a thickness of at least about 0.02 inches. The cover of the present invention is preferably about 0.02 to 0.125 inches, and more preferably from about 0.03 to 0.10 inches. Golf balls also typically have at least about 60 percent dimple coverage, preferably at least about 70 percent dimple coverage, of the surface area. The cover layer has a Shore D hardness of at least about 20 and preferably between about 30 and about 65. The golf ball of the present invention preferably has a compression of less than about 120.

Golf balls of the present invention can be manufactured by numerous methods. The core may be made by methods well known in the art, by using either a conventional wound core construction, or a conventional solid construction of one or more layers. The wound core construction can be either a solid rubber-based center or a liquid filled center, around which a tensioned elastomeric material is wound. A conventional solid construction preferably comprises a cis-1,4 polybutadiene rubber that has been cross-linked with a metal salt of an unsaturated fatty acid, such as zinc diacrylate. A conventional multi-layer construction may include multi-layered cores of different polybutadiene based materials to form inner and outer core layers.

These core constructions are then covered using conventional compression injection molding or casting techniques with a cover formulation containing a segmented polyurethane such as BioSpan® C which contains polycarbonate in the soft segment and a urea hard segment. BioSpan® SPU contains polyether in the soft segment. There are many methods to utilize these materials. One non-limiting example includes BioSpan® C being formed into a layer over a golf core by a one-shot (or alternately a pre-polymer approach) process. This is done, for example, by mixing a soft segment of polycarbonate polyol (PC) with a hard segment of 4,4'-diphenymethane diisocyanate (MDI), ethylene diamine (ED) and 1,3-cyclohexanediamine (CHD), and a typical endgroup, such as dodecylamine (DDA). The covers are preferably between about 0.05 and 0.10 inches thick.

In another embodiment, the copolymers of either segmented polycarbonate polyurethane or polyether polyurethane is blended with at least one thermoplastic or thermoset polymer, including ionomers and their acid ionomers and including highly neutralized polymers; polyolefins; polyacrylates; polyamides; polyphenylene oxides; polyisoprenes; block copoly (ethers or ester-amides); block copoly (ethers or ester-esters); polysulfones, reaction injection moldable thermoplastic and thermoset polymers; block copolymers of styrene-butadiene and its hydrogenated derivatives; dynamically vulcanized ethylene-propylene rubbers; polyvinylidenefluorides; acrylonitrile-butadiene styrene copolymers; epoxy resins; polystyrenes; acrylics; polyethylenes; polybutadienes; and polyesters.

Another embodiment comprises a core, an inner cover having a flexural modulus greater than about 50,000 psi, and a cover comprised of segmented polycarbonate-urea elastomers. The cover preferably has thickness of between about 0.02 to 0.05 inches and has initial modulus of less than about 10,000 psi. In another embodiment, the initial modulus is greater than about 10,000 psi. The segmented polyurethane elastomer preferably has an ultimate elongation of at least about 40% to about 1000%, preferably between about 400% and about 800%.

An alternative embodiment comprises a core, a cover, and an intermediate layer comprising the segmented polycarbonate-urea elastomers. The intermediate layer preferably has a thickness of about 0.02 to about 0.08 inches and has initial modulus of less than about 10,000 psi, preferably from about 300 to about 10,000 psi.

In one embodiment, the core comprises polybutadiene rubber, and the cover and intermediate layers comprise thermoplastic silicone-urethane copolymers. The core preferably has a diameter of at least about 1.5 inches. Preferably, the intermediate layer thickness is about 0.02 to about 0.08 inches, and the combined thickness of the cover and the intermediate layer is of less than about 0.1 inch. The polybutadiene rubber composition of the core preferably comprises at least about 2.2 pph of a halogenated organosulfur compound, preferably zinc pentachlorothiophenol (or the sale thereof).

While it is apparent that the invention disclosed herein is well calculated to fulfill the objects stated above, it will be appreciated that numerous modifications and embodiments may be devised by those skilled in the art. Such modifications may include density modifying additives, UV absorbing additives, hindered amine light stabilizers, optical brighteners, foamed layers, moisture barrier layer, etc. In addition to its use in a golf ball, the present invention can be used in other golf equipment such as inserts in golf clubs. Therefore, it is intended that the appended claims cover all such modifications as falling within the true spirit and scope of the present invention.

What is claimed is:

1. A golf ball comprising:

a core of at least one layer;

a cover of at least one layer disposed concentrically about the core and having a Shore D hardness of between 30 and 65; and at least one intermediate layer disposed between the cover and the core;

wherein the cover comprises a segmented polyurethane elastomer having a surface modifying end group.

2. The golf ball according to claim 1, wherein the segmented polyurethane elastomer is formed from the reaction product of a hydroxyl terminated polycarbonate, an aromatic diisocyanate, and a low molecular weight diamine.

3. The golf ball according to claim 1, wherein the segmented polyurethane elastomer is blended with at least one thermoplastic or thermoset polymer selected from the group consisting of ionomers and their acid polymers including highly neutralized acid polymers, polyurethane, polyolefins, polyacrylates, polyamides, polyphenylene oxide, polyisoprenes, block copoly (ether or ester-amide), block copoly (ether or ester-ester), polysulfones, reaction injection moldable thermoplastic and thermoset polymers, block copolymer of styrene-butadiene with its hydrogenated derivatives, dynamically vulcanized ethylene-propylene rubber, polyvinylidenefluorides, acrylonitrile-butadiene styrene copolymer, epoxy resins, polystyrenes, acrylics, polyethylenes, polybutadienes, polyesters, silicone-urethanes and polycarbonate urethane.

4. The golf ball according to claim 1, wherein the cover has a thickness of about 0.02 to about 0.125 inches.

5. The golf ball according to claim 1, wherein the at least one intermediate layer has a thickness of about 0.02 to about 0.08 inches.

6. The golf ball according to claim 1, wherein the core has a diameter of at least about 1.55 inches.

7. The golf ball according to claim 1, wherein the core comprises a center that is solid, hollow, fluid filled, or gel-filled.

8. The golf ball according to claim 1, wherein the cover comprises a thermoplastic material having a flexural modulus of at least about 50,000 psi.

9. The golf ball according to claim 1, wherein the segmented polyurethane elastomer has a tensile strength of greater than about 10,000 psi.

10. The golf ball according to claim 1, wherein the segmented polyurethane elastomer has an ultimate elongation of about 400 to about 800 percent.

11. The golf ball according to claim 1, wherein the segmented polyurethane elastomer has an initial modulus from about 300 psi to about 10,000 psi.

12. The golf ball according to claim 1, wherein the cover layer has a thickness of from about 0.01 to 0.12 inches.

13. The golf ball according to claim 1, wherein the golf ball has a compression of less than about 120.

14. The golf ball according to claim 1, wherein the core has a diameter from about 1.00 to about 1.62 inches.

* * * * *